United States Patent [19]

Malak

[11] Patent Number: 4,861,104
[45] Date of Patent: Aug. 29, 1989

[54] SEAT CUSHION CONSTRUCTION AND METHOD OF UTILIZATION THEREOF

[75] Inventor: Ronald J. Malak, Utica, Mich.

[73] Assignee: General Motors Corporation, Detroit, Mich.

[21] Appl. No.: 149,806

[22] Filed: Jan. 29, 1988

[51] Int. Cl.[4] .............................................. A47C 31/02
[52] U.S. Cl. .................................... 297/218; 297/440; 297/452
[58] Field of Search ............... 297/218, 219, 440, 443, 297/452

[56] References Cited

U.S. PATENT DOCUMENTS

| | | | |
|---|---|---|---|
| 3,848,926 | 11/1974 | Kuroishi | 297/452 |
| 3,871,041 | 3/1975 | Plume | 297/219 X |
| 3,981,534 | 9/1976 | Wilton | 297/219 |
| 4,699,427 | 10/1987 | Kobayashi | 297/452 |
| 4,740,034 | 4/1988 | Snyder et al. | 297/452 |

FOREIGN PATENT DOCUMENTS

| | | | |
|---|---|---|---|
| 904979 | 9/1962 | United Kingdom | 297/452 |
| 2158351 | 11/1985 | United Kingdom | 297/219 |

Primary Examiner—Peter R. Brown
Attorney, Agent, or Firm—Ernest E. Helms

[57] ABSTRACT

A vehicle seat construction is provided. The preferred embodiment construction includes a seat frame having a curvilinear shaped a seat cushion bun is mounted on top of the frame a seat covering is provided for enclosing the seat cushion bun. The seat cover has along an edge connective means, a flexible non-molded polymeric trim retainer is attached with the frame at at least two separate locations. The trim retainer shapes the cover and is joined to the cover. The trim retainer also retains the cover to the seat cushion bun.

2 Claims, 2 Drawing Sheets

PRIOR ART

SEAT CUSHION CONSTRUCTION AND METHOD OF UTILIZATION THEREOF

FIELD OF THE INVENTION

The field of the present invention is that of vehicle seat constructions and methods of utilization thereof. More specifically, the field of the present invention relates to vehicle seat constructions having seat cushion trim retainers.

DISCLOSURE STATEMENT

The construction of the bottom portion of a typical bucket type vehicle seat, has a metallic tubular frame. The tubular frame has mounted on top a polymeric foam bun. To protect the polymeric foam bun there is provided a fabric or vinyl seat cover.

There are various methods of retaining the cover to the foam bun and frame. A method often utilized prior to the present invention was to have a relatively rigid injection molded plastic part, referred to as the trim retainer, fitted on top of the steel tubular frame. Prior to placement on the tubular frame, the trim retainer 5 (FIG. 1) typically was placed within the injection mold which formed the foam bun so that the trim retainer would be encapsulated by the foam bun 6. The retainer was then, by some method (usually by metallic fasteners), connected with the tubular frame. The foam bun was then surrounded by the seat cover and one of various methods was utilized to retain the fabric cover 8 around the retainer.

The prior seat construction had several disadvantages. One disadvantage was that the injection molded plastic trim retainer typically did not have good adhesion characteristics with the foam bun. The previous trim retainer due to its shape had to be injection molded and was not suitable to be made out of an extrusion. Furthermore, excessive material was required since the retainer shapes the lower portion of the vehicle seat along its side edges.

Another version of seat construction utilized a sheet metallic trim retainer which was welded to the tubular frame to provide a surface to connect with the seat cover. A major disadvantage of the metallic trim retainer is that it had to be riveted or welded to the seat frame.

A disadvantage of both of the aforementioned seat constructions is that when changing the configuration of the tubular frame for different styles, or sizes of vehicle seating, a new metallic or injection molded trim retainer must be utilized. Also when changing the "look" of the seat, as when lowering the seat side edges for a truck bucket seat versus a bucket seat for a sports vehicle a new custom molded trim retainer was required. The above changes greatly increased tooling costs.

DISCLOSURE STATEMENT

To overcome the above-noted problems, the present invention is brought forth. The present invention provides a vehicle seat construction and method of utilization thereof wherein the foam bun is mounted on the tubular frame. Surrounding the tubular frame is a flexible polymeric non-molded trim retainer which can be fabricated from an extrusion. The trim retainer is connected with the seat frame at at least two separate locations. The seat cover is then placed over the foam bun. The seat cover end has means of connection with the trim retainer to surround the foam bun. The trim retainer gives shape to the seat and retains the cover to the foam bun. The present invention seat construction is advantageous in that it does not require the custom injection molded retainer of prior seat constructions, nor does it require the welded or bolted metallic retainers. It is also an advantage of the present invention in that the trim retainer can be made of an excessive length and thereby can be utilized on various different sized seats. The trim retainer is also flexible to conform to the different configuration of seat tubular frames.

It is an object of the present invention to provide a vehicle seat construction and method of utilization thereof.

It is an object of the present invention to provide a vehicle seat construction including a seat frame having a curvilinear shape, a seat cushion bun mounted on the frame, a seat cover for enclosing the seat cushion bun, the cover along a lower edge having a connective means, and a flexible non-molded polymeric trim retainer with means of attachment with the frame at at least two separate locations whereby the trim retainer shapes the cover and has means of joining with the cover connective means for retaining the cover to the seat cushion bun and thereby retaining the seat cushion bun to the frame.

It is an object of the present invention to provide a vehicle seat construction including a metallic tubular seat frame having a curvilinear shape with two lateral sections projecting forward and joining with a front section, a foam polymer seat cushion bun having a grooved section aligned with the frame and mated therewith and mounted on top of the frame, a seat cover for enclosing the seat cushion bun having along a lower edge J connector open towards the foam bun, and a flexible extruded polymeric trim retainer attached with plastic fasteners with the metal frame at at least two separate points whereby the trim retainer shapes the cover and the trim retainer has an arrow head for joining with the cover J connector for retaining the cover in a tension fit to the seat cushion bun and thereby retaining the seat cushion bun to the frame and wherein the trim retainer holds the cover in a position to exclude the plastic fasteners from view.

It is an object of the present invention to provide a method of retaining a vehicle seat cover to the seat cushion bun including mounting on a seat frame with a curvilinear shape the seat cushion bun enclosing the seat cushion bun with a seat cover having along an edge connective means, and attaching along at least two points of the seat frame a flexible non-molded polymeric trim retainer, and adjoining the trim retainer with the cover connective means to shape the cover and to retain the cover to the seat cushion thereby retaining the seat cushion with the frame.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 2:
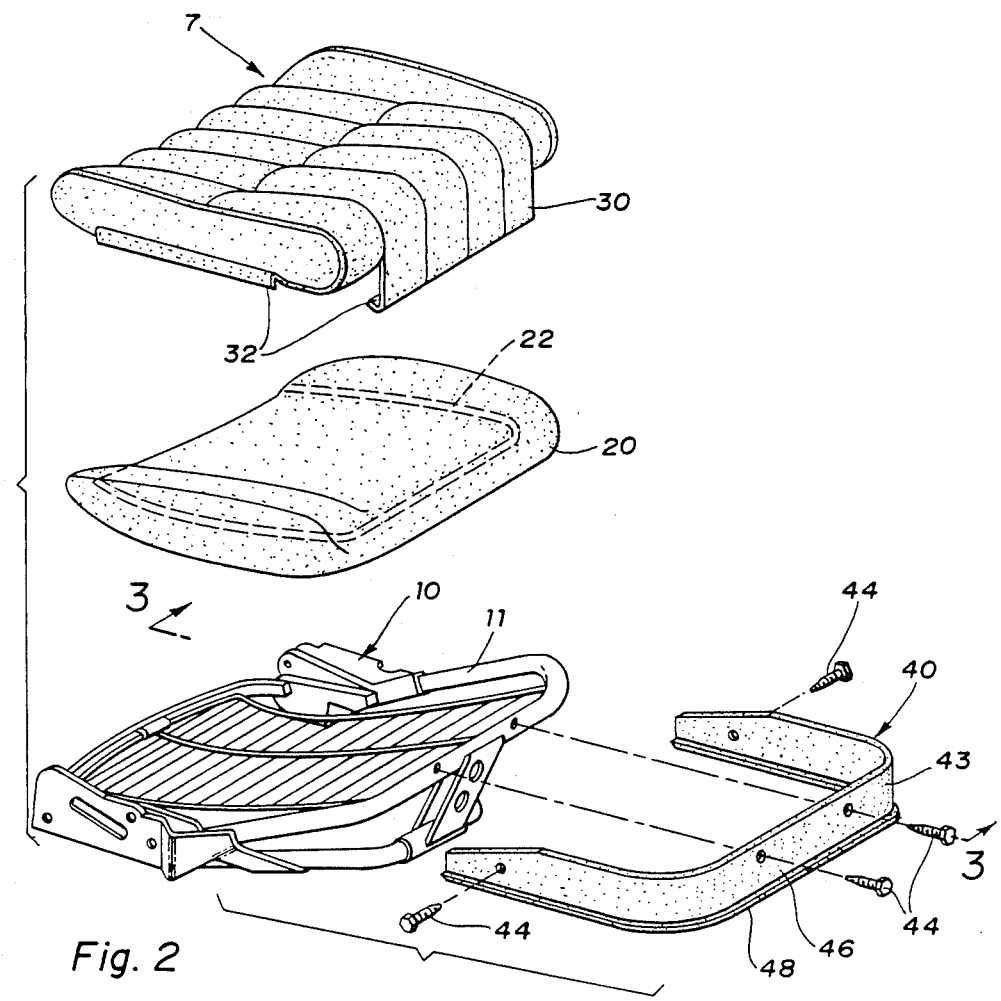
FIG. 2 is an exploded view of a preferred embodiment seat construction according to the present invention.
Figure 3:
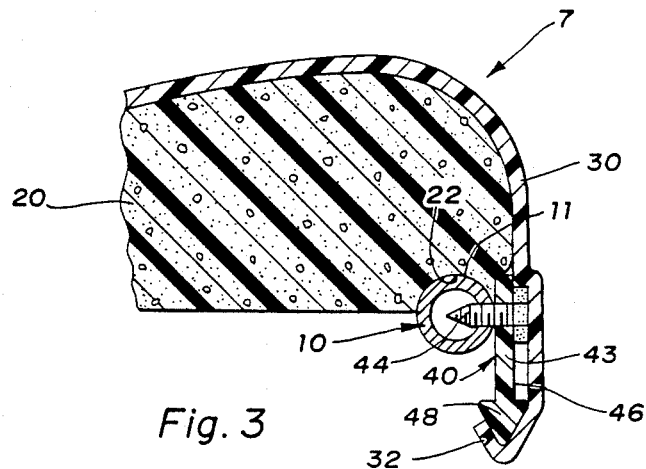
FIG. 3 is taken along line 3—3 of FIG. 2.
Figure 4:
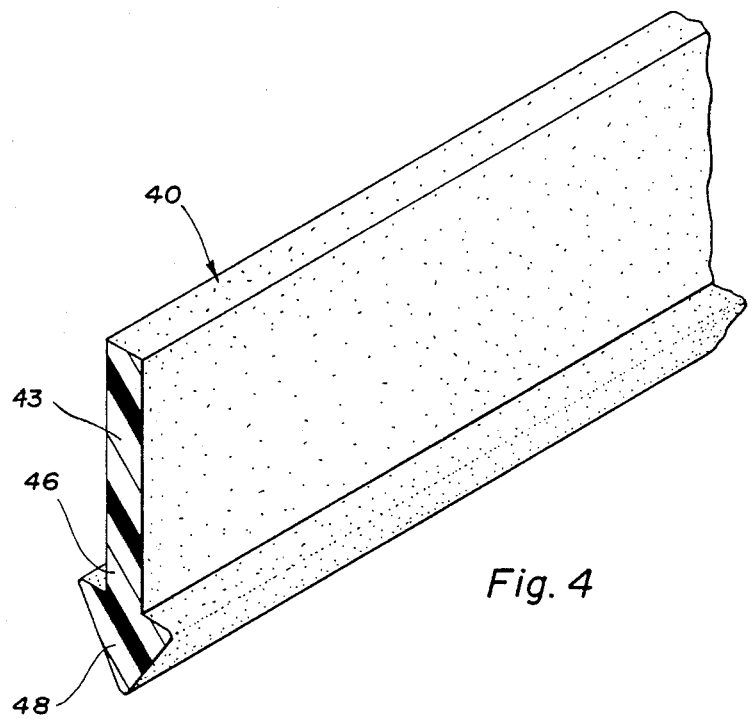
FIG. 4 is a perspective view of an extruded trim retainer utilized in the present invention.

Referring to FIGS. 2, 3 and 4, the seat construction 7 of the present embodiment has a seat frame 10. The tubular frame 10 is a metallic tubular fabrication having along its top edge 11, a curvilinear U-shaped tubular supporting portion shape. The frame 10 has two lateral sections projecting forward. The two lateral sections are joined with a front section. Mounted on top of the seat frame is an elastomeric foam seat cushion bun 20. The seat cushion has a groove 22 which is generally aligned with the top edge of the seat frame and is mated with the seat frame 10.

A seat cover 30 typically made of sheet polymeric material or fabric is utilized for enclosing and surrounding the seat cushion bun 20. The seat covering has along the front and side edges connective means which are typically a plastic J form 32 open towards the foam bun.

Attached to the seat tubular frame 10 in at least two locations and typically along four locations is a flexible non-molded polymeric trim retainer 40. Typical plastic fasteners 44 provide the means of attachment of the trim retainer 40 to the tubular frame 10. The trim retainer major cross-sectional dimension is generally straight (or flat) and the trim retainer planer portion 45 provides the shape of the lower portion of the seat form for the cover and has means of joining with the seat cover 30 along a lower edge 46 by a cross sectional arrow head 48 which snaps into the J retainer of the seat cover 30. The seat cover 30 and seat cushion bun 20 will now be retained to the tubular frame 10 in a tension fit. Also the plastic fasteners 44 will be excluded from view by the cover 30.

Figure 1:
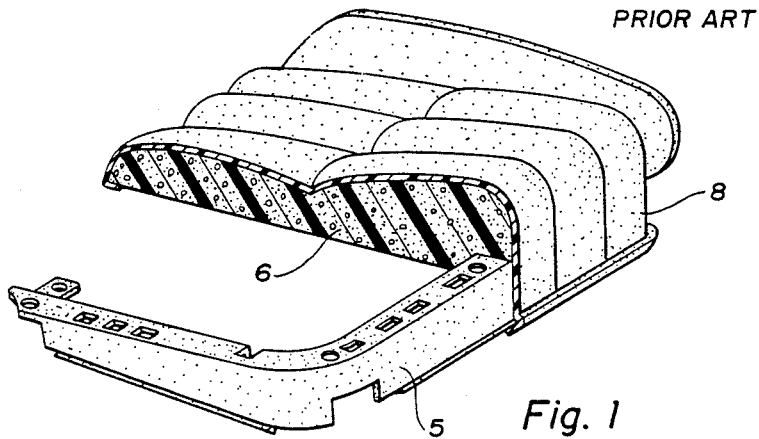
FIG. 1 is a sectioned view partially shown in perspective of a prior seat construction.

As will be apparent to those shilled in the art the inventive trim retainer 40 is far cheaper than the previous trim retainer 5 (FIG. 1).

If the tubular frame 10 size or configuration changes, the trim retainer 10 planar portion 43 which extends vertically can be attached to the tubular frame 10 at different locations. It is sometimes desirable to change the look of a seat by extending or shortening its forward or side edges, i.e., determining the length of cover below the tubular frame 10. With the present invention the location of attachment of the trim retainer 40 to the tubular frame can be adjusted upward or downward to accommodate the new look desired. The present invention provides a method of retaining a vehicle seat cover 30 to the seat cushion bun 20, the method including the following steps:

1. Mounting on a seat frame 10 with a curvilinear shape the seat cushion bun 20;
2. Enclosing seat cushion bun 20 with a seat cover 30 having along an edge connective means 32;
3. Attaching along at least two points of the seat frame 10 a flexible non-molded polymeric trim retainer 40; and
4. Joining the trim retainer 40 with the cover connective means 32 to shape the cover 30 and to retain the cover 30 to the seat cushion bun 20 thereby retaining the seat cushion bun 20 with the frame 10.

An embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat construction, said construction in combination comprising:

a seat frame having curvilinear shape and including a general U-shaped tubular supporting portion;

a seat cushion bun mounted on said on said tubular portion a seat cover for enclosing said seat cushion bun, said cover along a lower edge having a connective means; and a flexible non-molded polymeric trim retainer having a generally flat planar portion which is extending along a vertical plane with means of attachmeht at at least two separate locations with said frame and said tubular supporting portion whereby said trim retainer shapes said cover, and at a lower end of said retainer planar portion, said retainer has means of joining with said cover connective means for retaining said cover to said seat cushion bun thereby retaining said seat cushion bun to said frame.

2. A vehicle seat construction, said construction in combination comprising:

a metallic tubular seat frame having a curvilinear U-shaped tubular supporting portion with two lateral sections projecting forward and joining with a front section;

a foam polymer seat cushion bun having a grooved section aligned with said tubular supporting section and mated therewith and mounted on top of said frame;

a seat cover for enclosing said seat cushion bun having along a lower edge J-shaped connector open towards said foam bun; and a flexible extruded polymeric trim retainer having a generally flat planar portion which is extending along a vertical plane attached with plastic fasteners with said metal frame at at least two separate points whereby said trim retainer shapes said cover and said trim retainer has an arrow head at a lower end of said retainer planar portion for joining with said cover J-shaped connector for retaining said cover in a tension fit to said seat cushion bun and thereby retaining said seat cushion bun to said frame and wherein said trim retainer holds said cover in a position to exclude said plastic fasteners from view.

* * * * *